US010766685B2

(12) United States Patent
Kuhn et al.

(10) Patent No.: US 10,766,685 B2
(45) Date of Patent: Sep. 8, 2020

(54) BOX-TYPE TRANSPORT CONTAINER

(71) Applicant: VA-Q-TEC AG, Würzburg (DE)

(72) Inventors: Joachim Kuhn, Würzburg (DE); Ines Wallaschek, Würzburg (DE); Peter Bauer, Burghausen (DE); Martin Heinemann, Würzburg (DE); Thomas Taraschewski, Würzburg (DE); Fabian Eschenbach, Rottendorf (DE)

(73) Assignee: VA-Q-TEC AG, Würzburg (DE)

( * ) Notice: Subject to any disclaimer, the term of this patent is extended or adjusted under 35 U.S.C. 154(b) by 327 days.

(21) Appl. No.: 15/521,338

(22) PCT Filed: Oct. 20, 2015

(86) PCT No.: PCT/EP2015/002068
§ 371 (c)(1),
(2) Date: Apr. 24, 2017

(87) PCT Pub. No.: WO2016/066251
PCT Pub. Date: May 6, 2016

(65) Prior Publication Data
US 2017/0305639 A1 Oct. 26, 2017

(30) Foreign Application Priority Data
Oct. 27, 2014 (DE) .................... 20 2014 008 489 U

(51) Int. Cl.
B65D 81/38 (2006.01)
B65D 25/28 (2006.01)
(Continued)

(52) U.S. Cl.
CPC ....... B65D 81/3813 (2013.01); B65D 5/3621 (2013.01); B65D 5/46088 (2013.01);
(Continued)

(58) Field of Classification Search
CPC ..... A61J 1/165; B65D 81/3813; B65D 81/38; B65D 81/3853; B65D 5/3621;
(Continued)

(56) References Cited

U.S. PATENT DOCUMENTS 5,240,176 A 8/1993 Akers
5,323,911 A * 6/1994 Johnston ................ B65D 19/16
206/526
(Continued)

FOREIGN PATENT DOCUMENTS

DE 9213090 12/1992
EP 0 508 874 10/1992
(Continued)

OTHER PUBLICATIONS

International Search Report and Written Opinion, PCT/EP2015/002068, dated Apr. 29, 2016.
(Continued)

Primary Examiner — Elizabeth J Volz
(74) Attorney, Agent, or Firm — Andrus Intellectual Property Law, LLP

(57) ABSTRACT

A box-type transport container has a box-type outer container with a base, four side walls and at least one lid. The lid is hinged on a side wall. Sheet-type vacuum insulation panels are arranged in the outer container to cover the surface of the side walls. At least one carrying opening, which can be gripped by hand in order to carry the transport box, is provided in each of two opposing, side walls. The material of the side wall is weakened above and to the side of the carrying opening, such that the material can be easily separated from the surrounding material of the side wall and together with the carrying opening can be folded out of the side wall. Alternatively, the vacuum insulation panels of the
(Continued)

side wall are secured in their relative positions by at least one peripheral tensioning means.

48 Claims, 9 Drawing Sheets

(51) Int. Cl.
*B65D 5/46* (2006.01)
*B65D 5/36* (2006.01)
*B65D 43/16* (2006.01)
*F16L 59/065* (2006.01)

(52) U.S. Cl.
CPC ......... *B65D 25/2897* (2013.01); *B65D 43/16* (2013.01); *B65D 81/38* (2013.01); *B65D 81/3853* (2013.01); *F16L 59/065* (2013.01)

(58) Field of Classification Search
CPC ............ B65D 5/46088; B65D 25/2897; B65D 43/16; F16L 59/065
USPC ............... 220/592.27, 592.01, 592.2, 592.25
See application file for complete search history.

(56) References Cited

U.S. PATENT DOCUMENTS

| | | |
|---|---|---|
| 5,779,048 A | 7/1998 | Dunn |
| 2005/0241978 A1 | 11/2005 | Plue |
| 2007/0170232 A1 | 7/2007 | Spivey |
| 2008/0006628 A1* | 1/2008 | Goncharko ........ B65D 81/3816 220/4.33 |
| 2010/0326993 A1* | 12/2010 | Mayer ................. B65D 81/3825 220/592.27 |
| 2011/0147391 A1 | 6/2011 | Corder et al. |
| 2014/0054297 A1* | 2/2014 | Patstone ................... F25D 3/08 220/592.01 |
| 2014/0151382 A1* | 6/2014 | White ................. B65D 81/3862 220/592.2 |

FOREIGN PATENT DOCUMENTS

| | | | |
|---|---|---|---|
| EP | 2 022 727 | 2/2009 | |
| EP | 2 221 569 | 8/2010 | |
| JP | S58-036214 U | 3/1983 | |
| JP | H02-031822 U | 2/1990 | |
| JP | 2000211650 | 8/2000 | |
| JP | 2008114907 | 5/2008 | |
| JP | 2008201438 | 9/2008 | |
| WO | 2001/42092 | 6/2001 | |
| WO | 2004/104498 | 12/2004 | |
| WO | 2008/137883 | 11/2008 | |
| WO | 2008/137889 | 11/2008 | |
| WO | WO2013002325 | * 1/2013 | ............ B65D 81/38 |

OTHER PUBLICATIONS

International Preliminary Report on Patentability, PCT/EP2015/002068, dated May 2, 2017.

* cited by examiner

BOX-TYPE TRANSPORT CONTAINER

CROSS-REFERENCE TO RELATED APPLICATIONS

This application is the U.S. national stage application of International Application PCT/EP2015/002068, filed Oct. 20, 2015, which international application was published on May 6, 2016, as International Publication WO 2016/066251 in the English language. The International Application claims priority of German Patent Application No. 202014008489.0, filed Oct. 27, 2014. The international application and German application are both incorporated herein by reference, in entirety.

FIELD

The present disclosure relates to box-type transport containers.

BACKGROUND

The box-type transport container disclosed in WO 2008/137883 A1 is intended and suitable for transporting temperature-sensitive goods, especially goods which are sensitive in respect of fluctuations in the temperature in the interior. Such goods are certain pharmaceuticals, donated organs and blood products, for example, but also works of art etc. that are sensitive to fluctuations in temperature.

The known box-type transport container has a box-type outer container composed of corrugated paperboard, of corrugated plastic, possibly also of metal, or of a combination of such materials. In practice, the term corrugated plastic is sometimes used to denote plastic hollow-chamber sheets or plastic ridged sheets of thin-walled construction.

The box-type outer container has a bottom, four side walls and a cover. In the specific case, four individual covers are provided, wherein each of the individual covers is pivotally attached to one of the four side walls. However, box-type transport containers on which only a single complete cover is pivotally attached to one of the four side walls are also known.

The side walls of the known box-type outer container are of single-ply construction.

In order to maintain the temperature in the interior of the container at a uniform level for as long as possible, board-like vacuum insulation panels are situated in the outer container, being arranged so as to cover the surface of the side walls. Vacuum insulation panels are known per se and are described in the prior art, for example WO 2008/137889 A1. In particular, all the information on vacuum insulation panels is available from the additional prior art WO 2004/104498 A2.

The essential point is that there are no thermal bridges between the interior of the box-type transport container, which is used to hold the goods to be transported, and the surrounding atmosphere, that is to say basically the box-type outer container itself. It is therefore important to minimize the gaps between the vacuum insulation panels. This is accomplished, for example, by matching the box-type outer container as accurately as possible to the outside dimensions of the vacuum insulation panels arranged so as to cover the surface of the side walls.

In the case of the known box-type transport container explained above, the board-like vacuum insulation panels of the side walls are of prismatic design with smooth edges and are each arranged, circumferentially, in the box-type outer container so as to abut at one edge and to project freely at the other edge. It will be recognized that as used within the present disclosure, an "edge" may also be referred to as a "face". It is thereby possible, in the case of a cubic outer container, to produce all the board-like vacuum insulation panels provided on the side walls with the same dimensions, that is to say to use in fact just one size of vacuum insulation panel.

From another prior art document (EP 2 221 569 A1), there is a known practice, with the same aim, of making the board-like vacuum insulation panels of the side walls prismatic but with edges mitered at 45° and arranged so as to form an abutting miter joint. Here too, the same result is obtained for a cubic outer container, namely the use of just one size of vacuum insulation panel for the entire outer container.

In general, it is also possible, within the box-type outer container, to provide latent heat storage elements in board form or in some other form which make it possible to maintain the temperature in the interior of the transport container at a uniform level over a very long time and with very widely fluctuating outside temperatures (see also WO 2008/137883 A1). For the external shape of the latent heat storage elements there are the same possibilities as for the board-like vacuum insulation panels explained above (see WO 2008/137883 A1 and EP 2 221 569 A1).

The surfaces of the vacuum insulation panels are sensitive to mechanical damage. If the external skin of a vacuum insulation panel is damaged, it immediately loses its vacuum and hence the majority of its thermal insulation properties. In the case of the known box-type transport container, the box-type outer container, which, according to a preferred embodiment, is there composed of corrugated paperboard, is therefore embodied without carrying openings.

Removal boxes made of corrugated paperboard are known per se from the prior art, and, of course, these have a carrying opening in each of at least two opposing side walls.

Finally, it is advisable to have the possibility of keeping a box-type transport container of the type in question closed in a truly reliable manner, once it has been closed.

SUMMARY

The problem underlying the teaching of the invention is that of optimizing the known box-type transport container in respect of its efficient use.

According to a first teaching, the problem indicated above is solved in the case of a box-type transport container having a box-type outer container with a bottom, four side walls and at least one cover, wherein the cover is preferably pivotally attached to a side wall, and having board-like vacuum insulation panels arranged in the outer container so as to cover the surface of the side walls, by means of at least one carrying opening, which can be gripped by hand in order to carry the transport container. The carrying opening is provided in each of at least two, preferably opposing, side walls. The material of the side wall is weakened above and to the side of the carrying opening in such a way that said material can be easily separated from the surrounding material of the side wall and together with the carrying opening can be folded out of the side wall.

As in the case of removal boxes, at least one carrying opening, which can be gripped by hand in order to carry the transport container, is provided at least in each of two, preferably opposing, side walls of the box-type outer container. That is nothing special per se. However, to ensure that the surface of the vacuum insulation panels is not damaged at the inner surfaces of the side walls, but that the transport container is nevertheless easy to carry, provision is furthermore made for the material of the side wall to be weakened above and to the side of the carrying opening in such a way that said material can be easily separated from the surrounding material of the side wall and together with the carrying opening can be folded out of the side wall. In particular, the weakening of the material of the side wall above and to the side of the carrying opening is achieved by means of an appropriate perforation of the material of the side wall. In a particularly expedient way, this can be achieved by punching the material of the side wall.

Although the arrangement of a carrying opening in each of two opposing side walls of the box-type outer container is particularly preferred, it is also possible to arrange the carrying openings at other suitable points. This applies especially if relatively large transport containers are concerned. Large and heavy transport containers, for example, can by all means also have two times two carrying openings, which are optionally also arranged at different positions to enable different requirements in carrying to be met.

If the intention is to make the transport container convenient to carry, the hand of the carrier should pass completely through the carrying opening. This is possible with the transport container according to the invention because the tab formed by the material of the side wall around the carrying opening can fold out obliquely sideways. The transport container as a whole is then carried by means of this tab of material of the side wall of the outer container.

According to a preferred embodiment, it is furthermore envisaged that the carrying opening is provided with a peripheral opening reinforcement, in particular an opening reinforcement made of plastic.

According to another preferred embodiment, it is furthermore expedient to provide for the box-type outer container to be of two-ply design at the carrying openings, at least in the region of the side walls, and for the respective carrying opening to be situated only in the outer ply of the side wall. A two-ply configuration of the box-type outer container, at least in the region of the two opposite side walls in which the carrying openings are situated, is known per se. In this context, the advantage of the invention consists, in particular, in the fact that the free space between the two plies of the side walls can be very small. It has only to be a few mm, e.g. just 5 mm. This is sufficient to be able to grab the upper edge of the carrying opening by hand firmly enough to be able to fold the tab sideways out of the material of the side wall with the carrying opening situated therein at the weakening line. By virtue of the continuous inner ply of the side wall, even in the region of the carrying opening, the adjoining vacuum insulation panel remains reliably undamaged at the surface.

According to another and independent teaching, it is furthermore possible to envisage that the board-like vacuum insulation panels of the side walls are fixed in their position relative to one another by means of at least one tensioning means, preferably by means of two tensioning means arranged spaced apart, and can thus be handled as a coherent frame-type insert for the outer container. The positioning of the vacuum insulation panels relative to one another in this insert, taking into account the exertion of force by the one or more tensioning means, is particularly expedient in the case of board-like vacuum insulation panels which are of prismatic design with smooth edges and are each arranged, circumferentially, so as to abut at one edge and to project freely at the other edge.

In principle, the arrangement of the vacuum insulation panels is the same as that which is also already known in the prior art. According to the invention, however, it has been recognized that there is significant heat exchange between the interior of the transport container, on the one hand, and the external surrounding atmosphere, on the other hand, via the gaps between the vacuum insulation panels. If the vacuum insulation panels can be pressed against one another efficiently, so that the gaps become as small as possible or disappear entirely, these thermal bridges are very largely avoided. As has been recognized according to the invention, the box-type outer container itself cannot adequately perform this pressing of the vacuum insulation panels against one another.

According to the invention, an independent coherent frame-type insert is created from the vacuum insulation panels associated with the side walls by clamping these vacuum insulation panels together by means of at least one tensioning means, preferably by means of two encircling tensioning means arranged spaced apart. By means of the tensioning means, the vacuum insulation panels are pressed against one another at the edges, the gaps then become as small as possible and the heat transfer at these bridges is minimized.

It is advisable to provide a supporting frame as an abutment at the open side of the insert, at the location where the tensioning means is seated on the outside, in order to absorb the inward forces of the tensioning means.

To ensure that the one or more tensioning means do not cut into the sensitive outer layer of the vacuum insulation panels consisting of high barrier foil, the corners of the vacuum insulation panels placed together in the coherent frame-type insert are protected by means of corner protection elements, e.g. angled rails made of paperboard or plastic (metal is also possible in the design). In this way, any damage to the outer surface of the vacuum insulation panels is prevented, despite the fact that the edges thereof are pressed firmly together. It will be recognized that, as used within the present disclosure, a "corner protection element" may also be referred to as an "corner protection element", and within this context a "corner" may be referred to as an "edge".

In particular, a peripheral tensioning strap, i.e. a material strip of flat cross section consisting, for example, of a highly tear-resistant woven fabric, e.g. a nylon woven fabric, may be considered as a tensioning means. The tensioning force is thereby distributed over a relatively large area. As an alternative, it is also possible to use a tensioning cable. It is also possible to provide a U-shaped clamp or a plurality of U-shaped clamps. A tensioning means can also be achieved by means of a shrink film shrunk onto the vacuum insulation panels. Finally, clamping of the vacuum insulation panels can also be achieved by sheathing the vacuum insulation panels arranged together by means of foamable plastic, in particular polyurethane.

According to another, independent teaching of the invention, it is furthermore possible to envisage that a vacuum insulation panel is firmly attached to the cover in its position matching the vacuum insulation panels of the side walls. Thus, the vacuum insulation panel is situated on the cover from the outset. It is lowered with the cover onto the frame-type insert which may be present and, in all cases, has the correct position relative to the vacuum insulation panels of the side walls. Attachment by adhesive bonding, e.g. by means of a double-sided adhesive tape, or with the aid of hook-and-loop tape, is particularly expedient.

A vacuum insulation panel should of course also be arranged on the bottom in the box-type outer container.

There are likewise preferred variants for the arrangement of the vacuum insulation panel situated at the bottom. In a first expedient variant, it is envisaged that the vacuum insulation panel associated with the bottom is arranged below the vacuum insulation panels of the side walls and corresponds in length and width to the external length and external width of the assembled vacuum insulation panels of the side walls or, preferably, is of slightly larger dimensions. For this purpose, it is furthermore recommended that the corner protection elements extend as far as the vacuum insulation panel associated with the bottom, with the result that the vacuum insulation panel associated with the bottom is clamped jointly with the vacuum insulation panels of the side walls.

Particularly if the vacuum insulation panel situated at the bottom is given slightly larger dimensions than the assembled vacuum insulation panels of the side walls, the vacuum insulation panel situated at the bottom is independently grasped and fixed by the corner protection elements pressed on by the tensioning means. An oversize of the order of millimeters is sufficient here to achieve the desired contact pressure.

As an alternative, the vacuum insulation panel situated at the bottom can also be arranged inside the vacuum insulation panels of the side walls, with a corresponding effect.

According to another preferred teaching, the cover should be provided with lateral guide tabs, which enter guides on the adjoining side walls of the outer container as the container is closed. At the end, therefore, a solid, torsionally rigid overall construction of the box-type transport container is obtained. There are then also virtually no gaps causing thermal bridges between the vacuum insulation panels of the side walls and the vacuum insulation panels of the bottom and cover.

As already noted several times, the overall concept is primarily concerned with avoiding gaps that cause thermal bridges. In the overall concept, it is possible for this purpose, according to a preferred teaching, to provide for the outside dimensions of the vacuum insulation panels to be made slightly larger than the inside dimensions of the box-type outer container in such a way that the vacuum insulation panels are pressed against one another when the cover is tightly closed. In this way, it is ensured that a little pressure is exerted on the vacuum insulation panels from above as the cover is closed. If the cover is fixed in this way, that is to say tightly closed by means of adhesive tape or in some other way, for example, the vacuum insulation panels of the closed transport container remain pressed against one another, and the gaps between the vacuum insulation panels are narrowed to the minimum residual dimension.

A further improvement as regards avoiding thermal bridges is provided by sealing strips on those surfaces of the vacuum insulation panels which come to rest on one another. These can be extremely thin foam strips, which provide the required additional sealing effect on the edges or other surfaces.

According to another teaching of the invention, which is once again significant in itself, it is finally envisaged that the cover is pivotally attached to a side wall by means of a hinge that cannot be detached in a nondestructive manner, and can be fixed to the opposite side wall by means of an anti-tamper seal in a manner that does not allow removal in a nondestructive manner. Here, the term "anti-tamper seal" stands for all kinds of seal which make it impossible to open the cover in a nondestructive manner.

Where the text above refers to a vacuum insulation panel, it is understood in all variants in the context of the teaching of the invention that such a vacuum insulation panel can itself also consist, in turn, of a plurality of individual, smaller vacuum insulation panels adjoining one another in such a way that they are flush. However, the variant in which just one single continuous vacuum insulation panel is associated with each side wall, on the one hand, and with the bottom and the cover, on the other hand, is particularly expedient. In this case, the smallest number of gaps forming thermal bridges is obtained.

It is also possible to interconnect larger vacuum insulation panels, that is to say, for example, to use a vacuum insulation panel which is U-shaped overall and which connects two vacuum insulation panels for side walls and the vacuum insulation panel situated at the bottom to one another, for example. Designs of this kind are known from the prior art and can likewise be used here.

As regards the overall box-type transport container with its box-type outer container, the box-type outer container can be provided structurally with a bottom that folds out automatically, referred to as an "automatic bottom". In the case of such a bottom, there remains an opening approximately in the middle of the bottom, through which the surface of a vacuum insulation panel situated at the bottom can be damaged. To prevent this, it is recommended that a protective inner layer of suitable material, e.g. likewise of plastic, be inserted on the bottom in order to protect the vacuum insulation panel.

The subject matter of the invention also includes an insert per se, said insert comprising vacuum insulation panels clamped together.

BRIEF DESCRIPTION OF THE DRAWINGS

The invention is explained in greater detail below with reference to a drawing, which illustrates just one preferred illustrative embodiment. In the drawing.

DETAILED DESCRIPTION OF THE DRAWINGS

Figure 1:
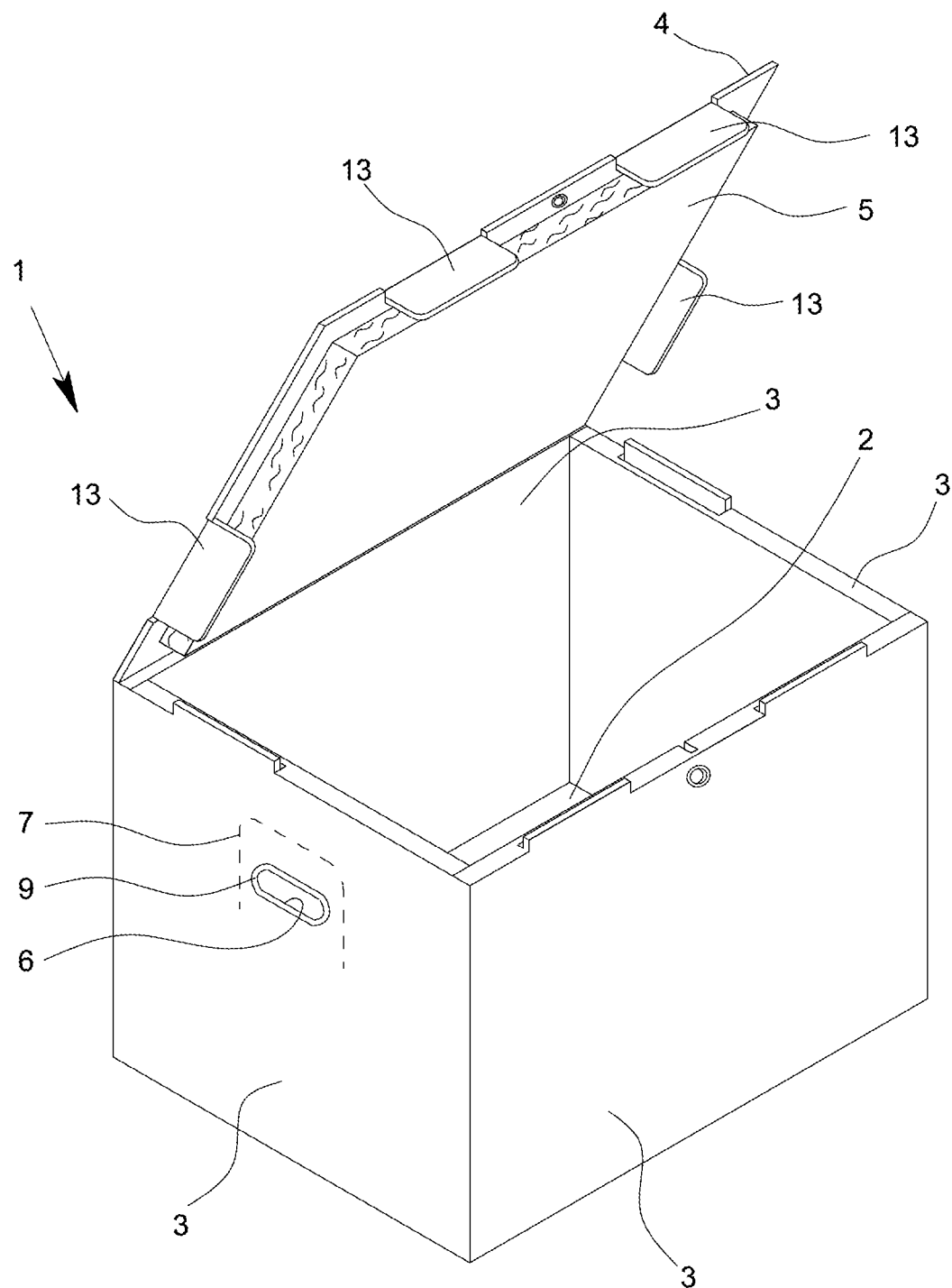
FIG. 1 shows a box-type transport container with the cover opened, more specifically the box-type outer container thereof without any other content, in a perspective view, FIGS. 2a, b show four vacuum insulation panels assembled in the manner of a frame, designed as a coherent frame-type insert for the outer container illustrated in FIG. 1, in two different variants.

The box-type transport container illustrated in perspective in FIG. 1 first of all has the box-type outer container 1 visible in FIG. 1. This has a bottom 2, four side walls 3 and a cover 4. In principle, it is also possible for a plurality of covers to be provided, e.g. for each side wall one cover pivotally attached there, as illustrated in the prior art explained at the outset. In the preferred illustrative embodiment illustrated here, however, only a single cover 4 is provided, which is here pivotally attached to the side wall 3 situated on the left at the rear in FIG. 1, more specifically by means of a material configuration in the form of a film hinge.

Figure 2A:
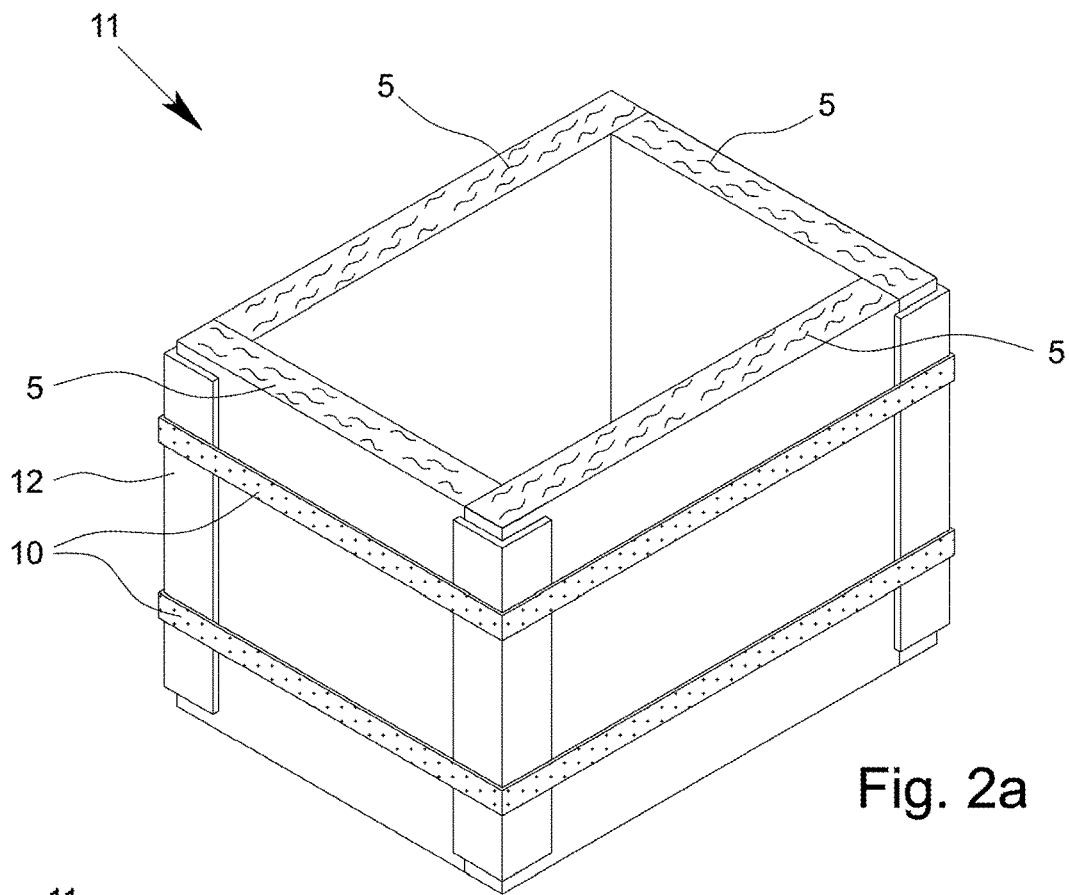
Figure 2B:
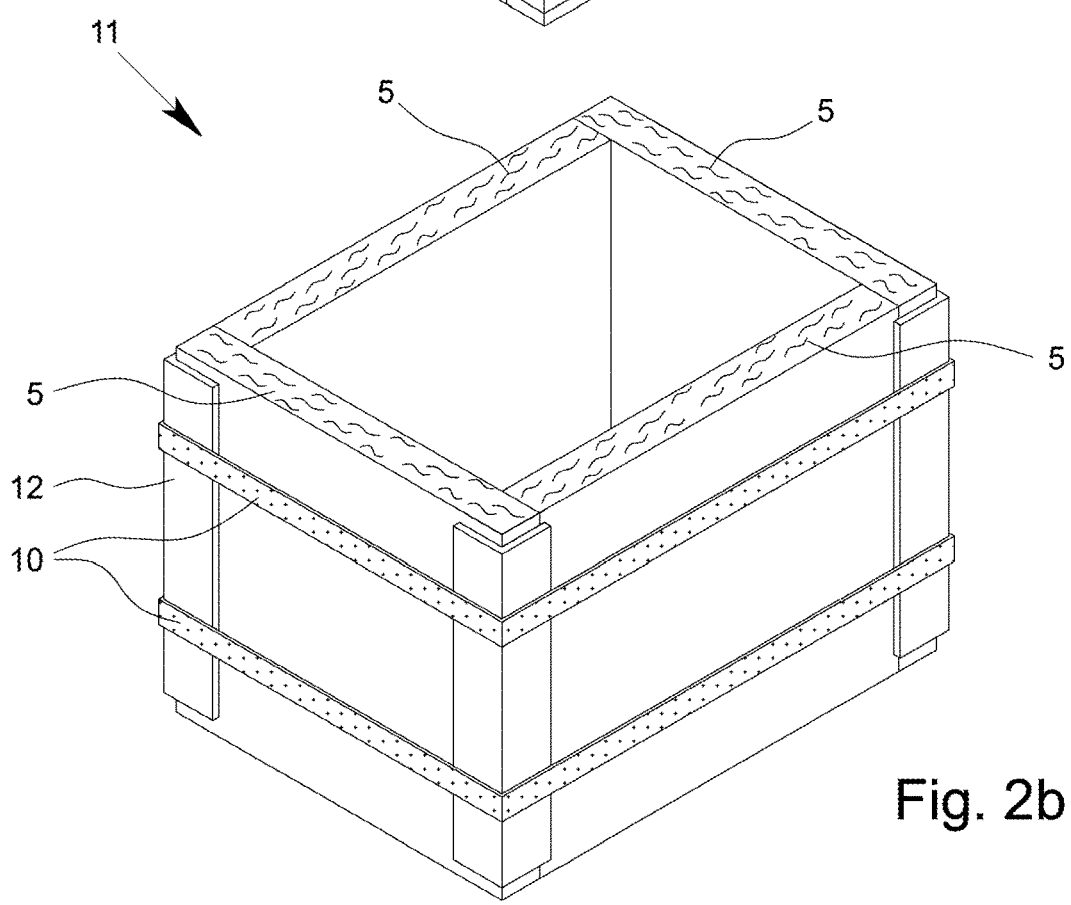
Figure 3:
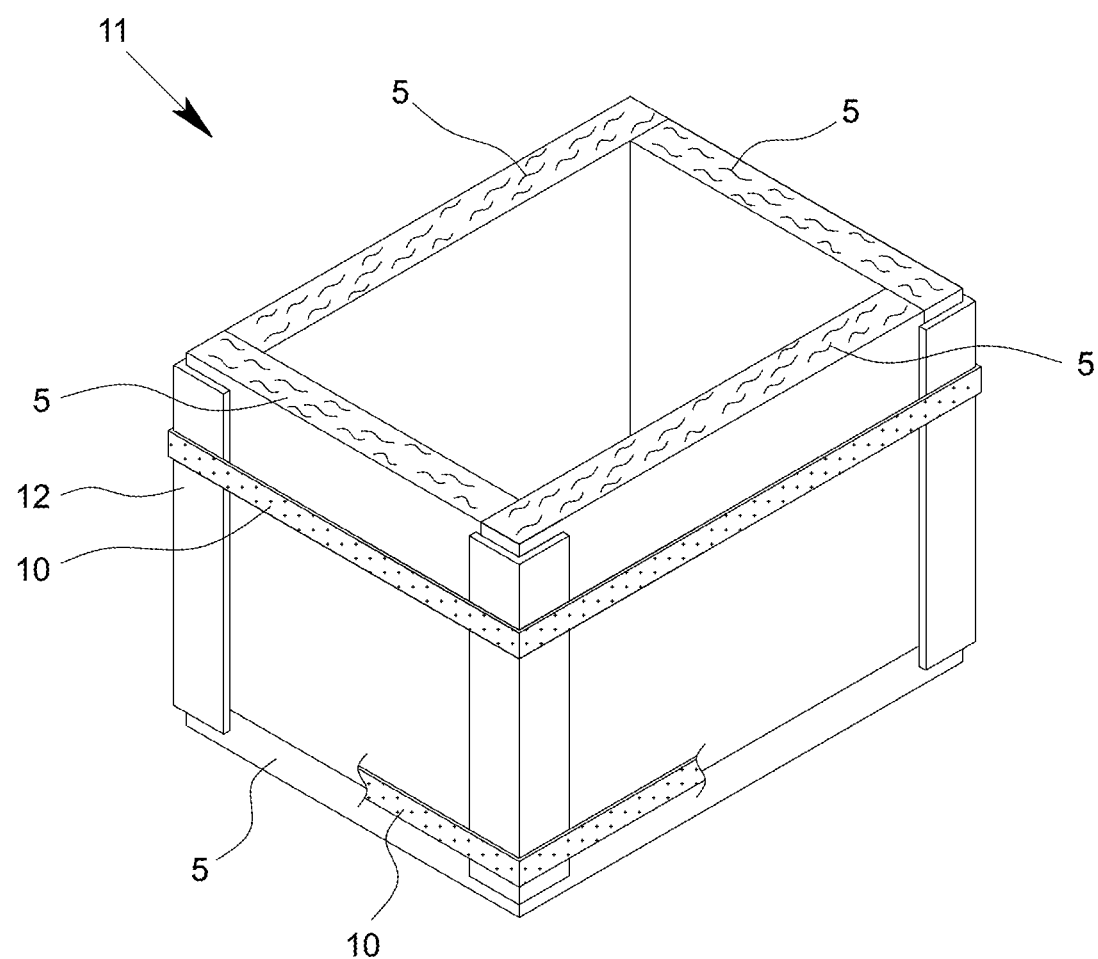
FIG. 3 shows the frame-type insert from FIG. 2a additionally provided with a vacuum insulation panel situated at the bottom, in an illustration corresponding to FIG. 2, FIGS. 4a, b show two further variants for the arrangement of a vacuum insulation panel situated at the bottom, in a side view.

In conjunction with FIG. 2, FIG. 3 shows that board-like vacuum insulation panels 5, arranged so as to cover the surface of the side walls 3, are situated in the outer container 1.

With the aid of the vacuum insulation panels 5, the free interior, visible in FIG. 3, of the box-type transport container is thermally insulated with respect to the outside. It is possible to insert further elements in the interior of the transport container, in particular latent heat storage elements, which keep the temperature in the interior of the transport container at a defined temperature or in a defined temperature range over a long period (see WO 2008/137883 A1, for example). These latent heat storage elements are not illustrated here and reference may be made globally in this connection to the prior art.

Figure 5:
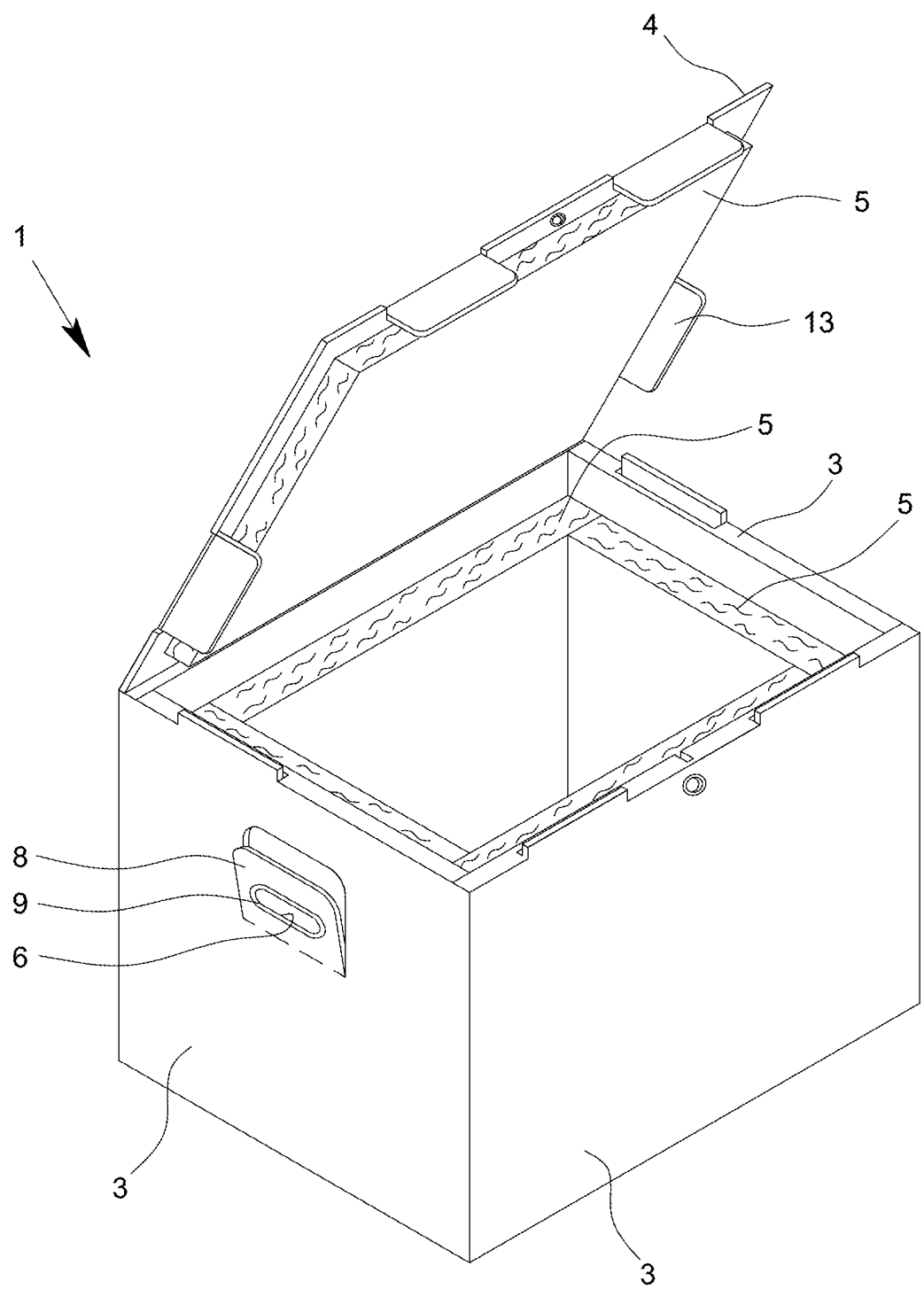
FIG. 5 shows the box-type transport container from FIG. 1 in an illustration corresponding to FIG. 1, now completed with the vacuum insulation panels from FIG. 2a in the interior of the box-type outer container.

In conjunction, FIGS. 1 and 5 now show that a carrying opening 6, which can be gripped by hand in order to carry the transport container, is provided here in each of two opposing side walls 3. The material of the side walls 3 is weakened above and to the side of the carrying opening 6 in such a way that said material can be easily separated from the surrounding material of the side wall 3 and together with the carrying opening 6 can be folded out of the side wall 3. The material of the side wall 3 is weakened above and to the side of the respective carrying opening 6 by virtue of the fact that there is a perforation line 7 there in the material of the corresponding side wall 3 (FIG. 1). If a person's hand reaches into the carrying opening 6, the material of the side wall 3 in this section can be detached from the material of the rest of the side wall by means of a powerful jerk, and the tab 8 thus formed together with the carrying opening 6 can be folded out of the rest of the side wall 3 (FIG. 3). In this way, the transport container as a whole can be comfortably carried by these tabs 8 on the two opposite sides of the transport container. As already remarked in the general part of the description, the carrying openings 6 can also be provided at different points and in a larger number.

In conjunction, it can be seen from FIGS. 1 and 5 that, in the illustrative embodiment shown, the carrying opening 6 is provided with a peripheral opening reinforcement 9, in particular an opening reinforcement made of plastic. Opening reinforcements 9 of this kind are known per se, especially from the area of transport packages, such as removal boxes etc.

It can be seen in FIG. 2a that the board-like vacuum insulation panels 5 of the side walls 3 are of cuboidal design with smooth edges and, circumferentially, are each arranged so as to abut at one edge and to project freely at the other edge. The corresponding arrangement can also be seen in FIG. 5.

FIG. 2b shows an arrangement in which the board-like vacuum insulation panels 5 of the side walls 3 are arranged in pairs opposite one another, either with both edges abutting (in FIG. 2b the vacuum insulation panels 5 situated on the left at the rear and on the right at the front) or with both edges projecting freely (in FIG. 2b the side walls 3 situated on the right at the rear and on the left at the front). In this arrangement, however, the mutual fixing of the vacuum insulation panels 5 is not quite as advantageous as in FIG. 2a.

Figure 9:
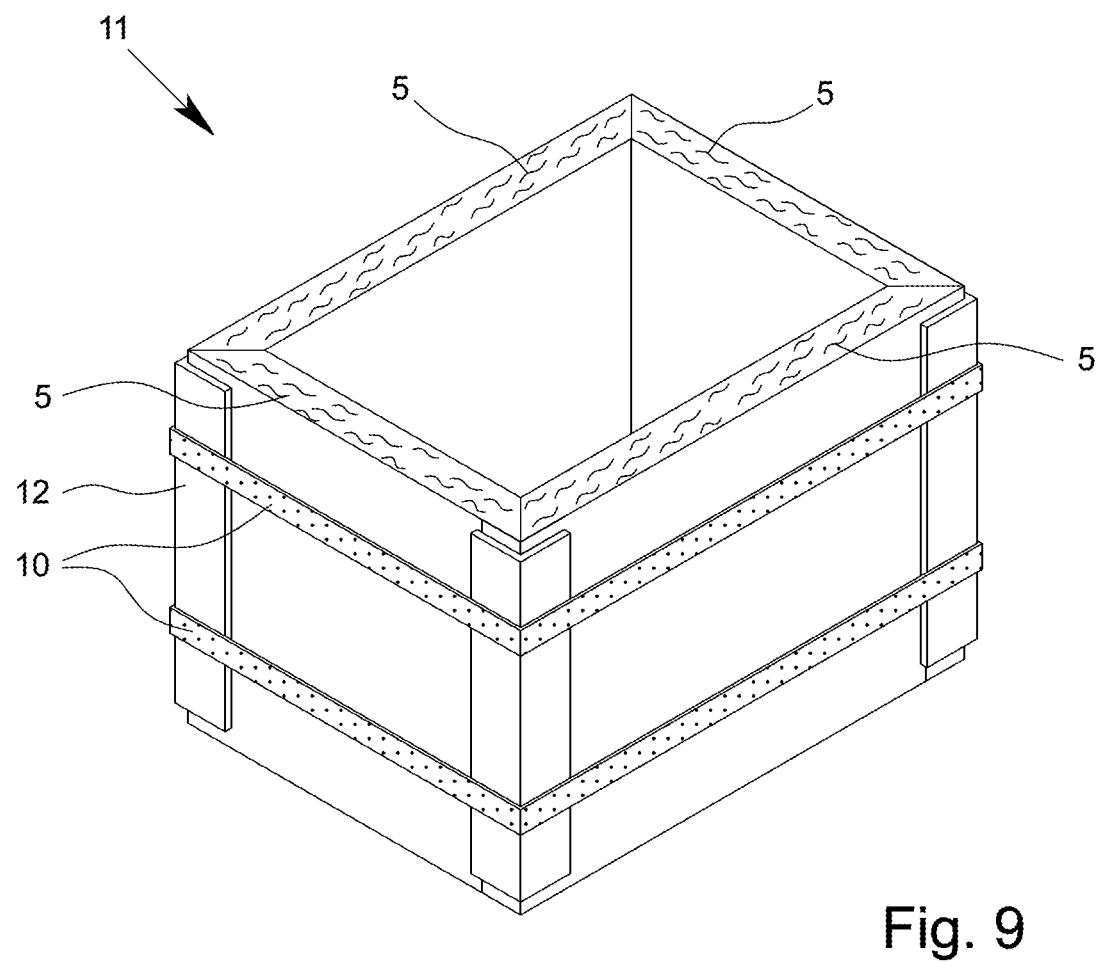
FIG. 9 shows another example of a box-type transport container having a prismatic design with edges mitered at 45° and arranged so as to form an abutting mitre-joint.

An alternative arrangement, which is likewise known from the prior art, consists in that the board-like vacuum insulation panels 5 of the side walls 3 are of prismatic design but with edges mitered at 45° and arranged so as to form an abutting miter joint (see FIG. 9).

The preferred illustrative embodiment shown in FIG. 2 shows a further teaching of the invention of relevance per se. For all variants of the combination of vacuum insulation panels 5, it is envisaged here, according to the invention, that the vacuum insulation panels 5, arranged in this way, of the side walls 3 are fixed in their position relative to one another by means of at least one encircling tensioning strap 10, preferably by means of two encircling tensioning straps 10 arranged spaced apart, and can thus be handled as a coherent frame-type insert 11 for the outer container 1. This independent frame-type insert 11 can be seen in each of FIGS. 2a and b. This can be handled independently as a whole and, as FIG. 5 shows, is pushed into the open box-type outer container 1 from above.

In principle, it can be stated that the vacuum insulation panels 5 arranged in the manner of a frame and assembled together are fixed in their position relative to one another by means of at least one tensioning means 10 and can thus be handled as a coherent frame-type insert 11 for the outer container 1. The preferred option is to work with two tensioning straps 10 arranged spaced apart. Instead of the tensioning straps 10 illustrated in the drawing, it is also possible to provide tensioning cables, U-shaped clamps, a shrink film shrunk onto the vacuum insulation panels 5 or a foamed sheath composed of foamable plastic, in particular of polyurethane, as tensioning means. Where there is a plurality of tensioning means, different types of tensioning means can optionally also be combined with one another.

Figure 6:
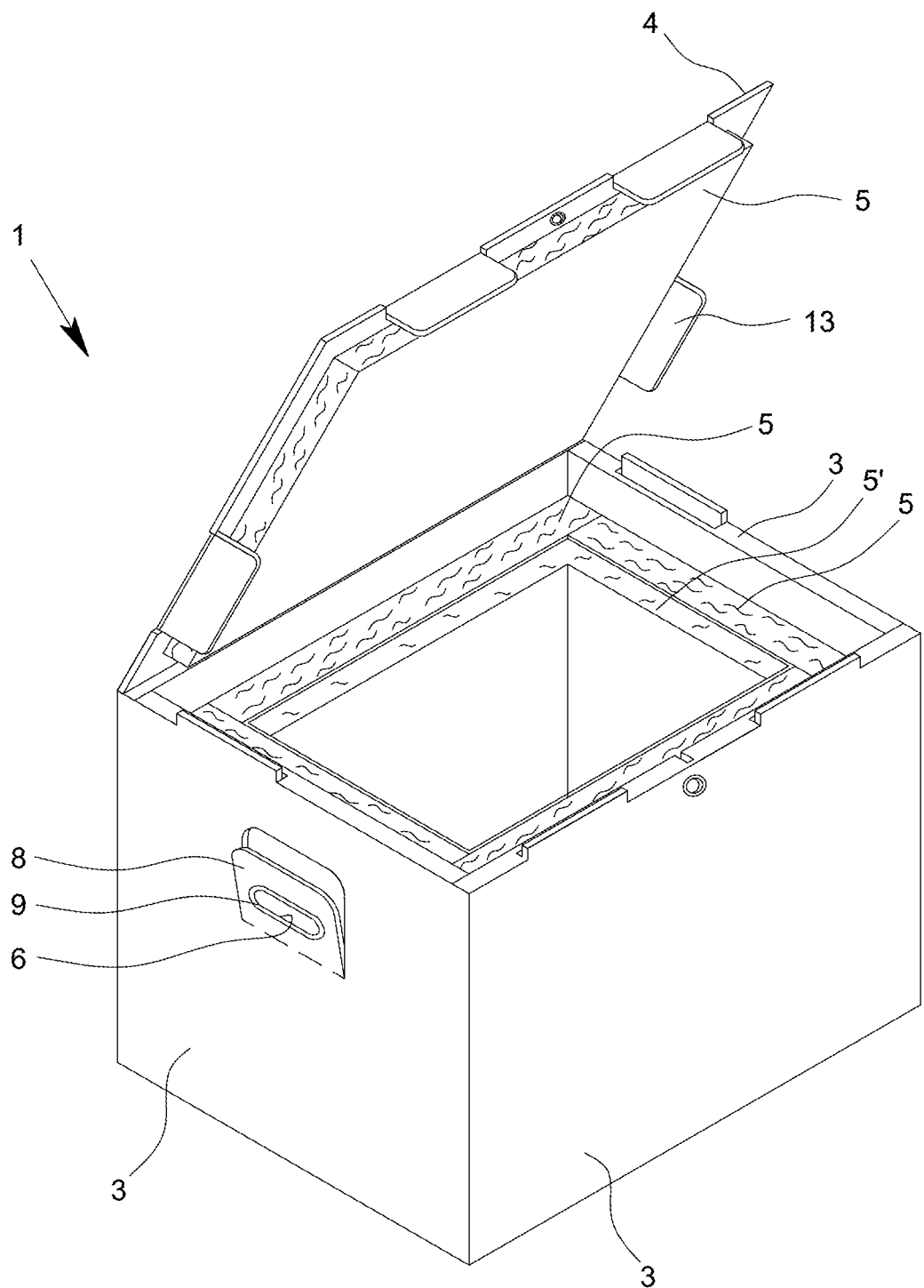
FIG. 6 shows a box-type transport container with an internal supporting frame in an illustration corresponding to FIG. 5.

It is expedient if tensioning means 10 are arranged close to the peripheral edges of the vacuum insulation panels 5. Thus, FIG. 6 shows a preferred modification of the illustrative embodiment from FIG. 5 such that a stiff supporting frame 5' is arranged on the inside of the vacuum insulation panels 5 where a tensioning means is arranged on the outside close to one of the peripheral edges of the vacuum insulation panels 5, said frame 5' acting as an abutment for the forces applied externally by the tensioning means 10 arranged here.

According to another preferred teaching, the significance of which has been explained in the general part of the description, provision is furthermore made here for the corners of the vacuum insulation panels 5 to be protected by corner protection elements 12, preferably made of plastic. Here, the corner protection elements 12 are rails of angled configuration made of paperboard or plastic, which protect the outer corners of the vacuum insulation panels 5 because they are arranged between the vacuum insulation panels 5 and the tensioning means 10. The two tensioning straps 10, which are here arranged one above the other with a spacing, can therefore be stretched taut. The vacuum insulation panels 5 are pressed tightly onto one another at their edges. The gaps located there become as small as possible, and the thermal bridges existing there are reduced to a very large extent. Corresponding arrangements also apply to the other types of tensioning means 10.

FIGS. 1 and 5 show another teaching of the invention which is of relevance per se, such that a vacuum insulation panel 5 is firmly attached to the cover 4 in its position matching the vacuum insulation panels 5 of the side walls 3. It can be seen how the vacuum insulation panel 5 on the cover 4 then automatically assumes the correct position on the vacuum insulation panels 5 of the side walls 3 when the cover 4 is moved into its envisaged closed position. In the illustrative embodiment shown in FIG. 5, the vacuum insulation panel 5 is adhesively bonded to the cover 4 with the aid of a double-sided adhesive tape, for example. This can also be achieved in a corresponding way with hook-and-loop tape.

Of course, it can be assumed that a vacuum insulation panel 5 is inserted and preferably firmly attached at the bottom 2 of the outer container 1 in its position matching the vacuum insulation panels 5 of the side walls 3. To this extent, FIG. 3 shows a particularly preferred illustrative embodiment in respect of the vacuum insulation panel 5 situated at the bottom. There, provision is made for the vacuum insulation panel 5 associated with the bottom 2 to be arranged below the vacuum insulation panels 5 of the side walls 3 and to correspond in length and width to the external length and external width of the assembled vacuum insulation panels 5 of the side walls 3 or, preferably, to be of slightly larger dimensions. Here, the vacuum insulation panels 5 of the side walls 3 are arranged in the manner envisaged in FIG. 2a. Assuming that the dimensions of the vacuum insulation panels 5 of the side walls 3 are the same, the corner protection elements 12 are somewhat longer than in FIG. 2a. Provision is namely made for the corner protection elements 12 to extend as far as the vacuum insulation panel 5 associated with the bottom 2, with the result that the vacuum insulation panel 5 associated with the bottom 2 is clamped jointly with the vacuum insulation panels 5 of the side walls 3. The tensioning strap 10 situated at the bottom is positioned in such a way that it can also exert sufficient pressure on the edge of the vacuum insulation panel 5 situated at the bottom. In the illustration, the tensioning strap 10 is shown discontinuously in order to allow the underlying arrangement of the vacuum insulation panel 5 situated at the bottom to be seen. In practice, of course, this tensioning strap 10 runs around in exactly the same way as the upper tensioning strap 10.

Figure 4A:
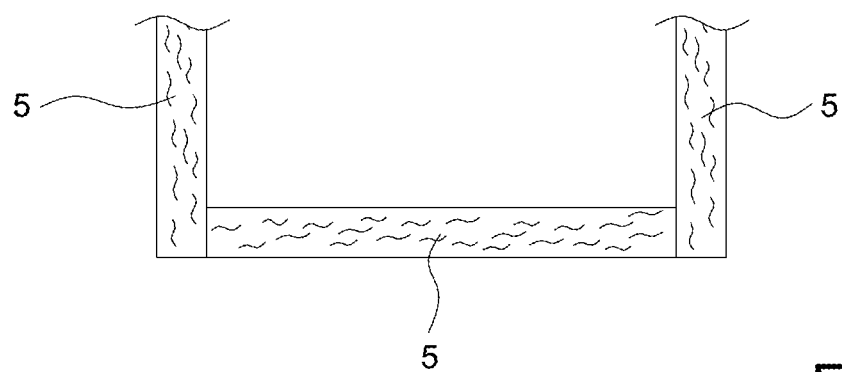

An alternative for the arrangement of the vacuum insulation panel 5 situated at the bottom can be understood by means of FIG. 4a. Here, provision is made for the vacuum insulation panel 5 associated with the bottom 2 to be arranged inside the vacuum insulation panels 5 of the side walls 3 and to correspond in length and width to the free internal length and internal width of the assembled vacuum insulation panels 5 of the side walls 3 or, preferably, to be of slightly larger dimensions.

Figure 4B:
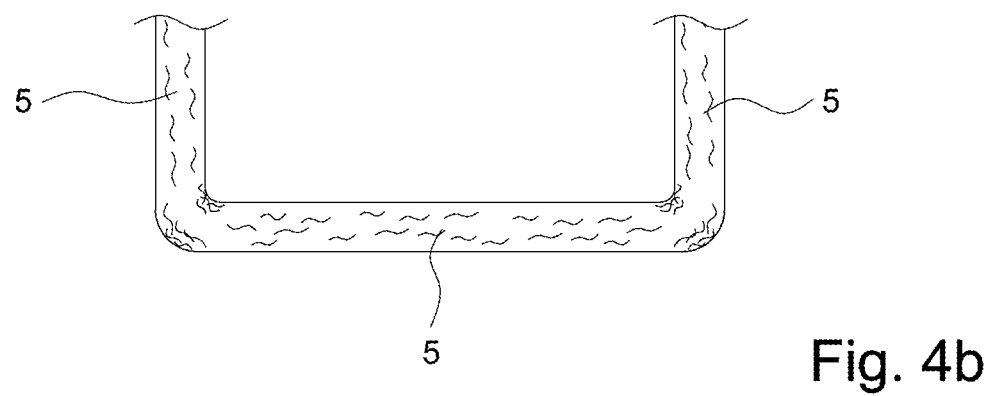

FIG. 4b shows another variant, in which the vacuum insulation panel 5 situated at the bottom, together with vacuum insulation panels 5 associated with two side walls 3, is connected to form a large twice-bent vacuum insulation panel 5 in a U shape. Such U-shaped arrangements of vacuum insulation panels 5 are known in practice and can also be used here in some circumstances.

A slight oversize of the vacuum insulation panel 5 situated at the bottom—here an oversize of the order of millimeters is generally already sufficient—should enable the gaps forming thermal bridges to be reduced to a large extent by means of the contact pressure that can be applied.

A further improvement may possibly be achieved with corresponding sealing strips on matching surfaces of the vacuum insulation panels 5 that come into contact. This is not shown in detail in the illustrative embodiment.

It can furthermore likewise be seen from FIG. 1 and FIG. 5 in conjunction that, in the preferred illustrative embodiment shown, the cover 4 is provided with lateral guide tabs 13, which enter guides on the adjoining side walls 3 of the outer container 1 as the cover 4 is closed. This results in precise positioning of the cover 4 on the side walls 3 of the outer container 1 of the box-type transport container according to the invention.

Figure 7:
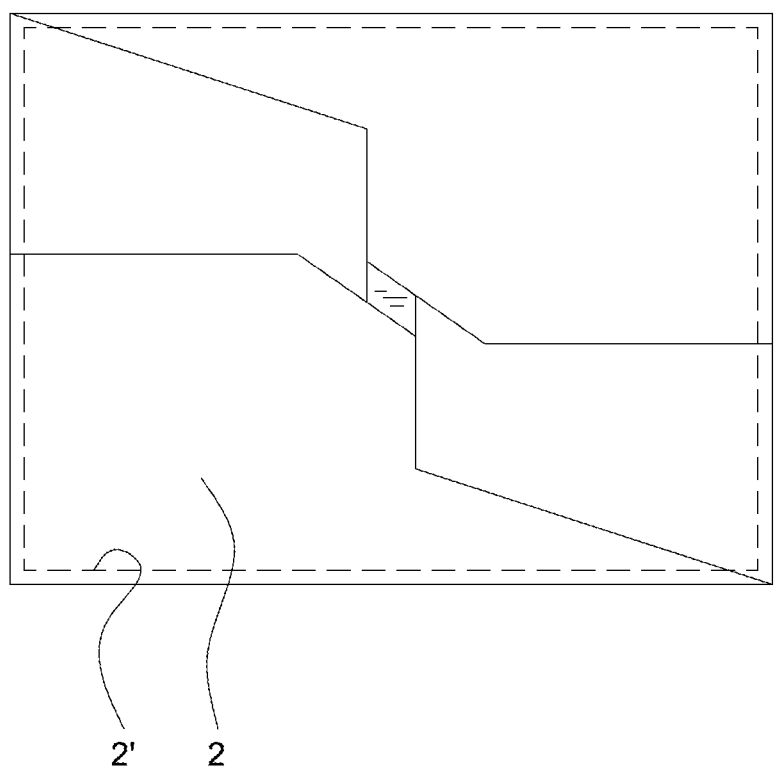
FIG. 7 shows the underside of the box-type transport container from FIG. 5 in a preferred embodiment with an automatic bottom.

In the case of folding outer containers 1, the bottom 2 can also be provided so as to be foldable, in particular in the form of an automatically folding bottom 2, an automatic bottom. The bottom 2 can be seen in a view of the outer container 1 from below (FIG. 7). In the case of an automatic bottom, there is unavoidably a residual opening in the central area. In the illustrative embodiment shown, this is neutralized by covering the bottom 2 of the box-type outer container 1 with an additional protective layer 2' on the inside. The protective layer 2' can be achieved by means of a thin inserted panel. However, it can also be achieved by means of fold-in tabs, although these are then expediently of asymmetric dimensions.

Figure 8:
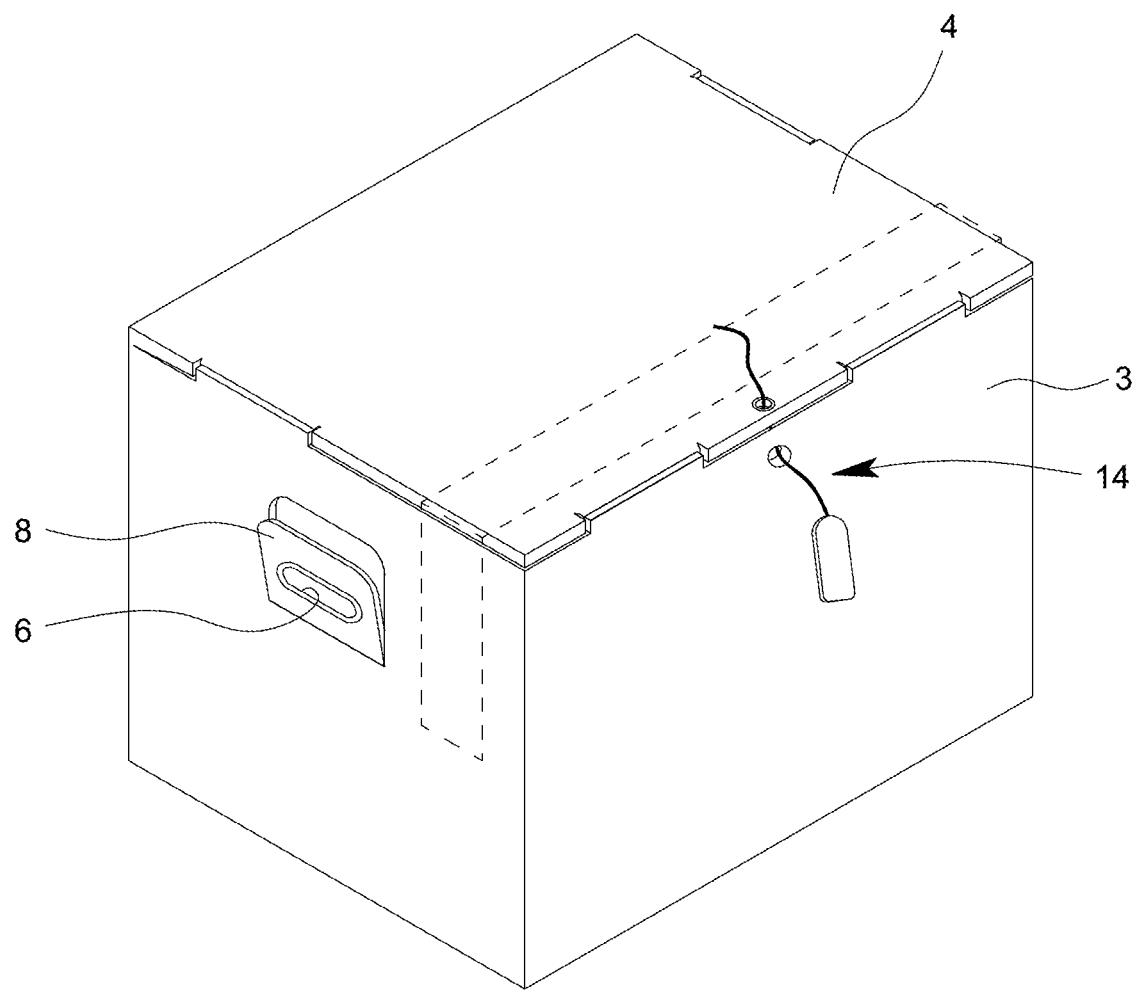
FIG. 8 shows the box-type transport container from FIG. 5, now closed and before anti-tamper sealing.

FIG. 8 shows the box-type transport container now in a completely closed state. Since the cover 4 carries the vacuum insulation panel 5, it is possible, by clamping the cover 4 firmly to the side walls 3, to press the vacuum insulation panel 5 on the cover 4 onto the blunt edges of the vacuum insulation panels 5 on the side walls 3. This is indicated in FIG. 8 by an adhesive tape illustrated in dashed lines. If this is stretched taut over the cover 4, the minimum gaps between the vacuum insulation panels 5 with respect to the cover 4 are also obtained to this extent.

In order to optimize the clamping effect of the cover 4, provision is made in the preferred illustrative embodiment shown for the outside dimensions of the vacuum insulation panels 5 to be made slightly larger than the inside dimensions of the box-type outer container 1 in such a way that the vacuum insulation panels 5 are pressed against one another when the cover 4 is tightly closed. In this context too, an oversize can be very small. In general, an oversize of the order of millimeters is sufficient.

FIG. 8 furthermore shows a special feature of the invention such that the cover 4 is pivotally attached to a side wall 3 by means of a hinge that cannot be detached in a nondestructive manner and can be fixed to the opposite side wall 3 by means of an anti-tamper seal 14 in a manner that does not allow removal in a nondestructive manner. In this way, the box-type transport container can also be used for transporting goods that must be secured, e.g. for transporting organs for the purpose of transplantation etc. As already discussed in the general part of the description, an "anti-tamper seal" can be taken to mean any means of securing against opening without destruction, i.e. any form of seal.

For economic reasons, it is advisable for the box-type outer container 1 to be composed of paperboard, in particular of corrugated paperboard. In this way, the external volume is as small as possible. The weight is low and the costs are favorable. The vacuum insulation panels 5 in the interior, which are clamped together to form the insert 11 according to the invention, lead to the likewise excellent insulating effect of the box-type transport container.

For reasons connected with transportation, however, it can also be advisable to produce the box-type outer container 1 from a corrugated plastic or from thin hollow-chamber/ridged plates. This makes the box-type outer container 1 insensitive to moisture and hence better suited to ambient conditions frequently arising during transport. It is also possible to use combinations of different materials, extending as far as combinations of paperboard, plastic and metal, to optimize the overall construction.

Tests have shown that a reduction in heat losses from the interior of the transport container of about 10% is achieved with the tensioning means 10, in particular the tensioning straps 10, for the formation of the insert 11 from the vacuum insulation panels 5 of the side walls 3 because the thermal bridges are very largely neutralized. A comparable improvement in respect of the heat losses, namely a reduction likewise of about 10% relative to an initial value, is achieved if the cover 4 together with the vacuum insulation panel 5 at that location is pressed sufficiently hard onto the vacuum insulation panels 5 of the insert 11.

For the dimensions of the vacuum insulation panels 5, the values obtained for the thickness are preferably at least 10 mm to about 80 mm, preferably 30 mm to 60 mm.

The subject matter of the invention also includes per se an insert 11 comprising vacuum insulation panels 5 clamped together, which can also be inserted into other outer containers 1, e.g. outer containers 1 made of plastic, or outer containers that are provided with further, independent insulation. The explanations that have been given above in relation to FIGS. 2a, b, FIG. 3 and FIGS. 4a, b apply in corresponding fashion to this insert 11 per se, consisting of vacuum insulation panels 5 clamped together.

The invention claimed is:

1. A box-type transport container comprising:
a box-type outer container having a bottom, four side walls and a cover, wherein the cover is pivotally attached to one of the side walls; and
board-like vacuum insulation panels disposed in the outer container and covering surfaces of the side walls;
wherein the vacuum insulation panels have a design that is selected from a group consisting of
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means and can thus be handled as a coherent frame-type insert for the outer container, the transport container further comprising corner protection elements disposed between the vacuum insulation panels and the at least one tensioning means.

2. The transport container as claimed in claim 1, wherein the vacuum insulation panels have peripheral edges and wherein the at least one tensioning means is arranged close to at least one of the peripheral edges.

3. The transport container as claimed in claim 1, further comprising a supporting frame disposed inside the vacuum insulation panels, wherein the at least one tensioning means is arranged outside of and close to peripheral edges of the vacuum insulation panels, the supporting frame providing an abutment for forces applied externally by the at least one tensioning means.

4. The transport container as claimed in claim 1, wherein the at least one tensioning means is selected from a group consisting of a tensioning strap disposed around the vacuum insulation panels, a tensioning cable disposed around the vacuum insulation panels, a U-shaped clamp, a shrink film shrunk onto the vacuum insulation panels, and a foamed sheath composed of foamable plastic.

5. The transport container as claimed in claim 1, further comprising another vacuum insulation panel firmly attached to the cover in a position matching the vacuum insulation panels of the sidewalls.

6. The transport container as claimed in claim 5, wherein the sum of the outside height dimensions of the vacuum insulation panels covering the side walls and the outside depth dimension of the another vacuum insulation panel attached to the cover is slightly larger than inner height dimensions of the outer container, so that the vacuum insulation panels covering the sidewalls and the vacuum insulation panel attached to the cover are pressed against one another when the cover is tightly closed.

7. The transport container as claimed in claim 1, further comprising another vacuum insulation panel disposed at the bottom of the container in a position matching the vacuum insulation panels of the side walls.

8. The transport container as claimed in claim 7, wherein the vacuum insulation panel of the bottom is disposed below the vacuum insulation panels of the side walls and corresponds in length and width to an external length and external width of the vacuum insulation panels of the side walls.

9. The transport container as claimed in claim 8, wherein the corner protection elements extend as far as the vacuum insulation panel of the bottom, so that the vacuum insulation panel of the bottom is jointly clamped with the vacuum insulation panels of the side walls.

10. The transport container as claimed in claim 7, wherein the vacuum insulation panel of the bottom is disposed inside the vacuum insulation panels of the side walls and corresponds in length and width to a free internal length and internal width of the insulation panels of the side walls, collectively.

11. The transport container as claimed in claim 1, further comprising lateral guide tabs on the cover, wherein the lateral guide tabs enter guides on the side walls of the outer container when the cover is closed.

12. The transport container as claimed in claim 1, wherein edges or surfaces of the vacuum insulation panels define a gap and are provided with additional sealing means.

13. The transport container as claimed in claim 1, wherein the bottom of the outer container is a self-folding bottom, and wherein the bottom of the outer container has an inside that is covered with an additional protective layer.

14. The transport container as claimed in claim 1, wherein the at least one tensioning means comprises two spaced apart tensioning means that fix the vacuum insulation panels in position relative to each other.

15. The transport container as claimed in claim 1, further comprising a stiff supporting frame disposed inside of the vacuum insulation panels, wherein the at least one tensioning means comprises a tensioning means located close to outside peripheral edges of the vacuum insulation panels, wherein the supporting frame provides an abutment for forces applied externally by the at least one tensioning means, and further comprising corner protection elements that protect corners of the vacuum insulation panels, the corner protection elements being disposed between the vacuum insulation panels and the at least one tensioning means.

16. The transport container as claimed in claim 15, wherein the tensioning means is selected from a group consisting of a tensioning strap running around the vacuum insulation panels of the sidewalls, a tensioning cable running around the vacuum insulation panels of the side walls, a U-shaped clamp, a shrink film shrunk onto the vacuum insulation panels, and a foamed sheath composed of foamable plastic.

17. The transport container as claimed in claim 16, further comprising another vacuum insulation panel that is firmly attached to the cover in a position matching the vacuum insulation panels of the side walls, wherein the outside dimensions of the vacuum insulation panels of the sidewalls are made slightly larger than inside dimensions of the box-type outer container in height, so that the vacuum insulation panels of the sidewalls and vacuum insulation panel of the cover are pressed against one another when the cover is tightly closed.

18. A box-type transport container comprising:
  a box-type outer container having a bottom, four side walls, and a cover, wherein the cover is pivotally attached to a side wall,
  board-like vacuum insulation panels arranged in the outer container so as to cover surfaces of the side walls, and
  a further vacuum insulation panel firmly attached to the cover such that, when the cover is closed, the further vacuum insulation panel overlaps the vacuum insulation panels covering the side walls,
  wherein the sum of the outside height dimensions of the vacuum insulation panels covering the side walls and the outside depth dimension of the further vacuum insulation panel is slightly larger than inside height dimensions of the outer container, so that the further vacuum insulation panel is pressed against the vacuum insulation panels covering the side walls when the cover is tightly closed.

19. A coherent frame-type insert for a box-type outer container of an altogether box-type transport container, the insert comprising:
  board-like vacuum insulation panels that have a design selected from a group consisting of:
    a prismatic design having smooth edges and being arranged in pairs opposite one another and having edges abutting or edges projecting freely,
    a prismatic design having smooth edges and being arranged, circumferentially, so as to abut at one edge and to project freely at an opposite edge, and
    a prismatic design having edges mitered at 45 degrees and being arranged with respect to each other so as to form an abutting miter joint;
  wherein the vacuum insulation panels are fixed in position relative to one another by at least one tensioning means, the insert further comprising corner protection elements that protect corners of the vacuum insulation panels, wherein the corner protection elements are disposed between the vacuum insulation panels and the at least one tensioning means.

20. The insert as claimed in claim 19, wherein the at least one tensioning means is located close to peripheral edges of the vacuum insulation panels.

21. The insert as claimed in claim 19, further comprising a stiff supporting frame disposed inside of the vacuum insulation panels, wherein the at least one tensioning means is arranged outside of and close to peripheral edges of the vacuum insulation panels, the supporting frame providing an abutment for forces applied externally by the at least one tensioning means.

22. The insert as claimed in claim 21, further comprising corner protection elements that protect corners of the vacuum insulation panels, the corner protection elements being disposed between the vacuum insulation panels and the at least one tensioning means.

23. The insert as claimed in claim 22, wherein the tensioning means is selected from a group consisting of a tensioning strap running around the vacuum insulation panels, tensioning cable running around the vacuum insulation panels, a U-shaped clamp, a shrink film shrunk onto the vacuum insulation panels, and a foam sheath composed of foamable plastic.

24. The insert as claimed in claim 19, wherein the tensioning means is selected from a group consisting of a tensioning strap running around the vacuum insulation panels, a tensioning cable running around the vacuum insulation panels, a U-shaped clamp, a shrink film shrunk onto the vacuum insulation panels, and a foam sheath composed of foamable plastic.

25. The insert as claimed in claim 19, wherein the vacuum insulation panels comprise vacuum insulation panels associated with the sidewalls and a vacuum insulation panel associated with the bottom and being disposed below the vacuum insulation panels of the side walls and corresponding in length and width to an external length and external width of the vacuum insulation panels of the side walls, collectively.

26. The insert as claimed in claim 19, wherein a vacuum insulation panel of the bottom is disposed inside the vacuum insulation panels of the side walls and corresponds in length and width to a free internal length and internal width of the vacuum insulation panels of the side walls, collectively.

27. The insert as claimed in claim 26, wherein the at least one tensioning means comprises two spaced apart tensioning means that fix the vacuum insulation panels in position relative to each other.

28. The insert as claimed in claim 27, further comprising corner protection elements that extend as far as the vacuum insulation panel associated with the bottom, so that the vacuum insulation panel associated with the bottom is clamped jointly with vacuum insulation panels associated with the side walls.

29. A box-type transport container comprising:
  a box-type outer container having a bottom, four side walls and a cover, wherein the cover is pivotally attached to one of the side walls; and
  board-like vacuum insulation panels disposed in the outer container and covering surfaces of the side walls;
  wherein the vacuum insulation panels have a design that is selected from a group consisting of
    a prismatic design having smooth edges and being arranged in pairs opposite one another and having edges abutting or edges projecting freely,
    a prismatic design having smooth edges and being arranged, circumferentially, so as to abut at one edge and to project freely at an opposite edge, and
    a prismatic design having edges mitered at 45 degrees and being arranged with respect to each other so as to form an abutting miter joint;
  wherein the vacuum insulation panels are fixed in position relative to one another by at least one tensioning means and can thus be handled as a coherent frame-type insert for the outer container, the transport container further comprising a supporting frame disposed inside the vacuum insulation panels, wherein the at least one tensioning means is arranged outside of and close to peripheral edges of the vacuum insulation panels, the supporting frame providing an abutment for forces applied externally by the at least one tensioning means.

30. The transport container as claimed in claim 29, wherein the at least one tensioning means is selected from a group consisting of a tensioning strap disposed around the vacuum insulation panels, a tensioning cable disposed around the vacuum insulation panels, a U-shaped clamp, a shrink film shrunk onto the vacuum insulation panels, and a foamed sheath composed of foamable plastic.

31. A box-type transport container comprising:
a box-type outer container having a bottom, four side walls and a cover, wherein the cover is pivotally attached to one of the side walls; and
board-like vacuum insulation panels disposed in the outer container and covering surfaces of the side walls;
wherein the vacuum insulation panels have a design that is selected from a group consisting of
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means and can thus be handled as a coherent frame-type insert for the outer container, the transport container further comprising another vacuum insulation panel firmly attached to the cover in a position matching the vacuum insulation panels of the sidewalls.

32. The transport container as claimed in claim 31, wherein the sum of the outside height dimensions of the vacuum insulation panels covering the side walls and the outside depth dimension of the another vacuum insulation panel attached to the cover is slightly larger than inner height dimensions of the outer container, so that the vacuum insulation panels covering the sidewalls and the vacuum insulation panel attached to the cover are pressed against one another when the cover is tightly closed.

33. The transport container as claimed in claim 31, further comprising another vacuum insulation panel disposed at the bottom of the container in a position matching the vacuum insulation panels of the side walls.

34. The transport container as claimed in claim 33, wherein the vacuum insulation panel of the bottom is disposed below the vacuum insulation panels of the side walls and corresponds in length and width to an external length and external width of the vacuum insulation panels of the side walls.

35. The transport container as claimed in claim 34, further comprising corner protection elements protecting disposed between the vacuum insulation panels of the sidewalls and the at least one tensioning means, wherein the corner protection elements extend as far as the vacuum insulation panel of the bottom, so that the vacuum insulation panel of the bottom is jointly clamped with the vacuum insulation panels of the side walls.

36. A box-type transport container comprising:
a box-type outer container having a bottom, four side walls and a cover, wherein the cover is pivotally attached to one of the side walls; and
board-like vacuum insulation panels disposed in the outer container and covering surfaces of the side walls;
wherein the vacuum insulation panels have a design that is selected from a group consisting of
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means and can thus be handled as a coherent frame-type insert for the outer container,
the transport container further comprising another vacuum insulation panel disposed at the bottom of the container in a position matching the vacuum insulation panels of the side walls, wherein the vacuum insulation panel of the bottom is disposed inside the vacuum insulation panels of the side walls and corresponds in length and width to a free internal length and internal width of the insulation panels of the side walls, collectively.

37. A box-type transport container comprising:
a box-type outer container having a bottom, four side walls and a cover, wherein the cover is pivotally attached to one of the side walls; and
board-like vacuum insulation panels disposed in the outer container and covering surfaces of the side walls;
wherein the vacuum insulation panels have a design that is selected from a group consisting of
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means and can thus be handled as a coherent frame-type insert for the outer container, the transport container further comprising lateral guide tabs on the cover, wherein the lateral guide tabs enter guides on the side walls of the outer container when the cover is closed.

38. A box-type transport container comprising:
a box-type outer container having a bottom, four side walls and a cover, wherein the cover is pivotally attached to one of the side walls; and
board-like vacuum insulation panels disposed in the outer container and covering surfaces of the side walls;
wherein the vacuum insulation panels have a design that is selected from a group consisting of
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means and can thus be handled as a coherent frame-type insert for the outer container, wherein edges or surfaces of the vacuum insulation panels define a gap and are provided with additional sealing means.

39. A box-type transport container comprising:
a box-type outer container having a bottom, four side walls and a cover, wherein the cover is pivotally attached to one of the side walls; and
board-like vacuum insulation panels disposed in the outer container and covering surfaces of the side walls;
wherein the vacuum insulation panels have a design that is selected from a group consisting of
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means and can thus be handled as a coherent frame-type insert for the outer container, wherein the bottom of the outer container is a self-folding bottom, and wherein the bottom of the outer container has an inside that is covered with an additional protective layer.

40. A box-type transport container comprising:
a box-type outer container having a bottom, four side walls and a cover, wherein the cover is pivotally attached to one of the side walls; and
board-like vacuum insulation panels disposed in the outer container and covering surfaces of the side walls;
wherein the vacuum insulation panels have a design that is selected from a group consisting of
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means and can thus be handled as a coherent frame-type insert for the outer container,
the transport container further comprising a stiff supporting frame disposed inside of the vacuum insulation panels, wherein the at least one tensioning means comprises a tensioning means located close to outside peripheral edges of the vacuum insulation panels, wherein the supporting frame provides an abutment for forces applied externally by the at least one tensioning means, and further comprising corner protection elements that protect corners of the vacuum insulation panels, the corner protection elements being disposed between the vacuum insulation panels and the at least one tensioning means.

41. The transport container as claimed in claim 40, wherein the tensioning means is selected from a group consisting of a tensioning strap running around the vacuum insulation panels of the sidewalls, a tensioning cable running around the vacuum insulation panels of the side walls, a U-shaped clamp, a shrink film shrunk onto the vacuum insulation panels, and a foamed sheath composed of foamable plastic.

42. The transport container as claimed in claim 41, further comprising another vacuum insulation panel that is firmly attached to the cover in a position matching the vacuum insulation panels of the side walls, wherein the outside dimensions of the vacuum insulation panels of the sidewalls are made slightly larger than inside dimensions of the box-type outer container in height, so that the vacuum insulation panels of the sidewalls and vacuum insulation panel of the cover are pressed against one another when the cover is tightly closed.

43. A coherent frame-type insert for a box-type outer container of an altogether box-type transport container, the insert comprising:
board-like vacuum insulation panels that have a design selected from a group consisting of:
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means, the insert further comprising a stiff supporting frame disposed inside of the vacuum insulation panels, wherein the at least one tensioning means is arranged outside of and close to peripheral edges of the vacuum insulation panels, the supporting frame providing an abutment for forces applied externally by the at least one tensioning means.

44. The insert as claimed in claim 43, further comprising corner protection elements that protect corners of the vacuum insulation panels, the corner protection elements being disposed between the vacuum insulation panels and the at least one tensioning means.

45. The insert as claimed in claim 44, wherein the tensioning means is selected from a group consisting of a tensioning strap running around the vacuum insulation panels, tensioning cable running around the vacuum insulation panels, a U-shaped clamp, a shrink film shrunk onto the vacuum insulation panels, and a foam sheath composed of foamable plastic.

46. A coherent frame-type insert for a box-type outer container of an altogether box-type transport container, the insert comprising:
board-like vacuum insulation panels that have a design selected from a group consisting of:
a prismatic design having smooth edges and being arranged in pairs opposite one another and having edges abutting or edges projecting freely,
a prismatic design having smooth edges and being arranged, circumferentially, so as to abut at one edge and to project freely at an opposite edge, and
a prismatic design having edges mitered at 45 degrees and being arranged with respect to each other so as to form an abutting miter joint;
wherein the vacuum insulation panels are fixed in position relative to one another by at least one tensioning means; and
wherein a vacuum insulation panel of the bottom is disposed inside the vacuum insulation panels of the side walls and corresponds in length and width to a free internal length and internal width of the vacuum insulation panels of the side walls, collectively.

47. The insert as claimed in claim 46, wherein the at least one tensioning means comprises two spaced apart tensioning means that fix the vacuum insulation panels in position relative to each other.

48. The insert as claimed in claim 47, further comprising corner protection elements that extend as far as the vacuum insulation panel associated with the bottom, so that the vacuum insulation panel associated with the bottom is clamped jointly with vacuum insulation panels associated with the side walls.

* * * * *

(12) POST-GRANT REVIEW CERTIFICATE (264th)
United States Patent
Kuhn et al.

(10) Number: US 10,766,685 J1
(45) Certificate Issued: Sep. 28, 2023

(54) BOX-TYPE TRANSPORT CONTAINER

(71) Applicants: Joachim Kuhn; Ines Wallaschek; Peter Bauer; Martin Heinemann; Thomas Taraschewski; Fabian Eschenbach

(72) Inventors: Joachim Kuhn; Ines Wallaschek; Peter Bauer; Martin Heinemann; Thomas Taraschewski; Fabian Eschenbach

(73) Assignee: VA-Q-TEC AG

Trial Number:

PGR2021-00085 filed Jun. 8, 2021

Post-Grant Review Certificate for:

Patent No.: 10,766,685
Issued: Sep. 8, 2020
Appl. No.: 15/521,338
Filed: Apr. 24, 2017

The results of PGR2021-00085 are reflected in this post-grant review certificate under 35 U.S.C. 328(b).

POST-GRANT REVIEW CERTIFICATE
U.S. Patent 10,766,685 J1
Trial No. PGR2021-00085
Certificate Issued Sep. 28, 2023

AS A RESULT OF THE POST-GRANT REVIEW PROCEEDING, IT HAS BEEN DETERMINED THAT:

Claims 1, 2, 4, 7-12, 14, 19-28, 36-38 and 43-48 are cancelled.

49. (substitute for claim 1) *A box-type transport container comprising:*
   a box-type outer container having a bottom, four side walls, and a cover, wherein the cover is pivotally attached to one of the side walls; and
   sidewall board-like vacuum insulation panels and a bottom board-like vacuum insulation panel disposed in the outer container and covering surfaces of the side walls and the bottom of the outer container, and a top board-like top vacuum insulation panel;
   wherein the sidewall vacuum insulation panels have a prismatic design having smooth edges and faces and are arranged circumferentially, so as to abut at one vertical edge of one sidewall vacuum insulation panel to a face of another sidewall vacuum insulation panel and to project freely at an opposite vertical edge;
   wherein the sidewall vacuum insulation panels are fixed in position relative to one another by at least one horizontally extending tensioning strap and corner protection elements and can thus be handled as a coherent frame-type insert with a top opening, wherein the corner protection elements comprise angled rails that extend vertically over vertical corners of the coherent frame-type insert and extend laterally beyond the respective abutting vertical edge, and said angled rails are disposed between the vacuum insulation panels and the at least one tensioning strap.

50. (substitute for claim 2) *The transport container as claimed in claim 49, wherein the at least one tensioning strap includes two horizontally extending tensioning straps spaced apart and encircling the sidewall vacuum insulation panels, wherein the sidewall vacuum insulation panels have peripheral top and bottom edges and wherein the bottom vacuum insulation panel is part of the coherent frame-type insert and one of the horizontally extending tensioning straps is arranged close to the bottom edge such that it exerts pressure on the bottom vacuum insulation panel.*

54. (substitute for claim 8) *The transport container as claimed in claim 49, wherein the bottom vacuum insulation panel is disposed below the sidewall vacuum insulation panels and corresponds in length and width to an external length and external width of the sidewall vacuum insulation panels of the side walls, and the coherent frame-type insert further comprises said bottom vacuum insulation panel.*

55. (substitute for claim 9) *The transport container as claimed in claim 54, wherein the corner protection elements extend as far as the vacuum insulation panel of the bottom, so that the bottom vacuum insulation panel is jointly clamped with the sidewall vacuum insulation panels.*

56. (substitute for claim 10) *The transport container as claimed in claim 49, wherein the vacuum insulation panel of the bottom is disposed between the vacuum insulation panels of the side walls and corresponds in length and width to a free internal length and internal width of the insulation panels of the side walls, collectively, wherein the height of the sidewall vacuum insulation panels combined with the thickness of the top vacuum insulation panel is slightly larger than inside dimensions of the box-type outer container in height, so that the sidewall vacuum insulation panels and the top vacuum insulation panel are pressed against one another when the cover is tightly closed.*

58. (substitute for claim 12) *The transport container as claimed in claim 49, wherein the lower edges of the sidewall vacuum insulation panels rest on the bottom vacuum insulation panel and the top vacuum insulation panel rests on the upper edges of the sidewall vacuum insulation panels, and edges or surfaces of the vacuum insulation panels which come to rest upon one another may define a gap and are provided with foam sealing strips on matching surfaces of the vacuum insulation panels that come into contact.*

61. (substitute for claim 19) *A coherent frame-type insert for a box-type outer container of an altogether box-type transport container, the insert comprising:*
   board-like vacuum insulation panels defining insert sidewalls, wherein the sidewall vacuum insulation panels each have a top end and a bottom end, and the sidewall vacuum insulation panels have,
   a prismatic design having smooth edges and faces and are arranged circumferentially, so as to abut at one vertical edge of one sidewall vacuum insulation panel to a face of another sidewall vacuum insulation panel and to project freely at an opposite vertical edge;
   wherein the sidewall vacuum insulation panels are fixed in position relative to one another by at least one horizontally extending tensioning strap encircling the sidewall vacuum insulation panels and the sidewall vacuum insulation panels can be handled as a coherent frame-type insert with a top opening;
   the insert further comprising corner protection elements that protect vertical corners of the sidewall vacuum insulation panels, the corner protection elements comprising angled rails that extend vertically over the vertical corners of the insert and extend laterally beyond the abutting vertical edge of the respective sidewall vacuum insulation panels, wherein the corner protection elements are disposed between the sidewall vacuum insulation panels and the at least one tensioning strap such that the at least one tensioning strap encircles the sidewall vacuum insulation panels and the angled rails.

62. (substitute for claim 20) *The insert as claimed in claim 61, wherein the insert further comprises a board-like bottom vacuum insulation panel defining an insert bottom and the at least one tensioning strap includes two horizontally extending tensioning straps spaced apart and encircling the insert sidewalls and the lower tensioning strap is located close to bottom edges of the sidewall vacuum insulation panels such that it exerts pressure on the bottom vacuum insulation panel.*

63. (substitute for claim 21) *The insert as claimed in claim 61, further comprising a stiff supporting frame disposed inside of the sidewall vacuum insulation panels and a board-like bottom vacuum insulation panel defining an*

POST-GRANT REVIEW CERTIFICATE
U.S. Patent 10,766,685 J1
Trial No. PGR2021-00085
Certificate Issued Sep. 28, 2023 insert bottom, wherein the at least one tensioning strap includes two horizontally extending and spaced apart tensioning straps and the lower tensioning strap is arranged outside of and close to bottom edges of the sidewall vacuum insulation panels such that it exerts pressure on the bottom vacuum insulation panel, the supporting frame providing an abutment for forces applied externally by the tensioning straps.

65. (substitute for claim 37) *A box-type transport container comprising:*
   *a box-type outer container having a bottom, four side walls and a cover, wherein the cover is pivotally attached to one of the side walls; and*
   *sidewall board-like vacuum insulation panels and a bottom board-like vacuum insulation panel disposed in the outer container and covering surfaces of the side walls and the bottom of the outer container, and a top board-like vacuum insulation panel attached to the cover;*
   *wherein the sidewall vacuum insulation panels have a design that is selected from a group consisting of:*
   *a prismatic design having smooth edges and being arranged in pairs opposite one another and having edges abutting or edges projecting freely,*
   *a prismatic design having smooth edges and being arranged, circumferentially, so as to abut at one edge and to project freely at an opposite edge, and*
   *a prismatic design having edges mitered at 45 degrees and being arranged with respect to each other so as to form an abutting miter joint;*
   *wherein the sidewall vacuum insulation panels are fixed in position relative to one another by at least one tensioning means and can thus be handled as a coherent frame-type insert with a top opening, wherein the top vacuum insulation panel closes the top opening of the insert and vertically presses against the top ends of the sidewall vacuum insulation panels when the cover of the outer container is closed;*
   *the transport container further comprising lateral guide tabs on the cover of the outer container and guides on the top of sidewalls adjoining the sidewall to which the cover is pivotally attached, wherein the lateral guide tabs enter guides on the side walls of the outer container when the cover is closed.*

67. (substitute for claim 46) *A coherent frame-type insert for a box-type outer container of an altogether box-type transport container, the insert comprising:*
   *board-like vacuum insulation panels defining insert sidewalls, an insert bottom, and an open top, wherein the insert sidewalls each have a top end and a bottom end, and the sidewall vacuum insulation panels have a design selected from a group consisting of:*
   *a prismatic design having smooth edges and being arranged in pairs opposite one another and having vertical edges abutting or vertical edges projecting freely,*
   *a prismatic design having smooth edges and being arranged, circumferentially, so as to abut at one vertical edge and to project freely at an opposite vertical edge, and*
   *wherein the vacuum insulation panels are fixed in position relative to one another by at least one horizontally extending tensioning strap encircling the insert sidewalls and can be handled as a coherent frame-type insert with a top opening; and*
   *wherein the insert bottom is disposed between the insert sidewalls and has length and width that correspond to a free internal length and internal width of insert sidewalls, collectively;*
   *the insert further comprising angled rails that vertically cover vertical corners of the coherent frame-type insert and extend laterally beyond the respective abutting vertical edge, wherein the at least one tensioning strap encircles the insert sidewalls and the angled rails with each angled rail extending as far as the insert bottom so that the insert bottom is clamped jointly with the insert sidewalls.*

68. (substitute for claim 47) *The insert as claimed in claim 67, wherein the at least one tensioning strap comprises two spaced apart tensioning straps that fix the insert sidewalls and the insert bottom in position relative to each other.*

* * * * *